Aug. 16, 1966  A. LUKSCH ETAL  3,266,846
SURFACE CONDITIONING MACHINE
Filed June 12, 1963  5 Sheets-Sheet 4

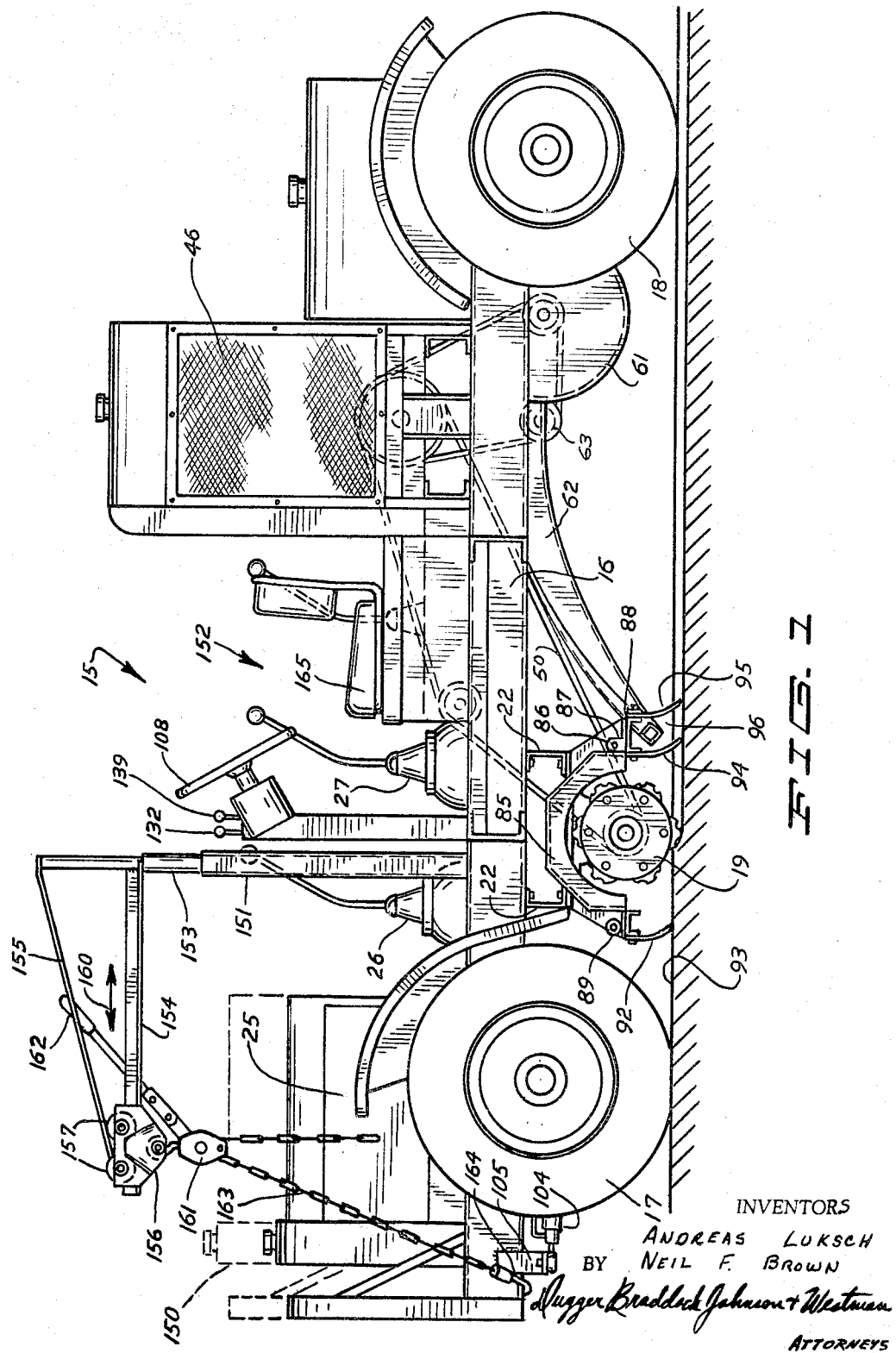

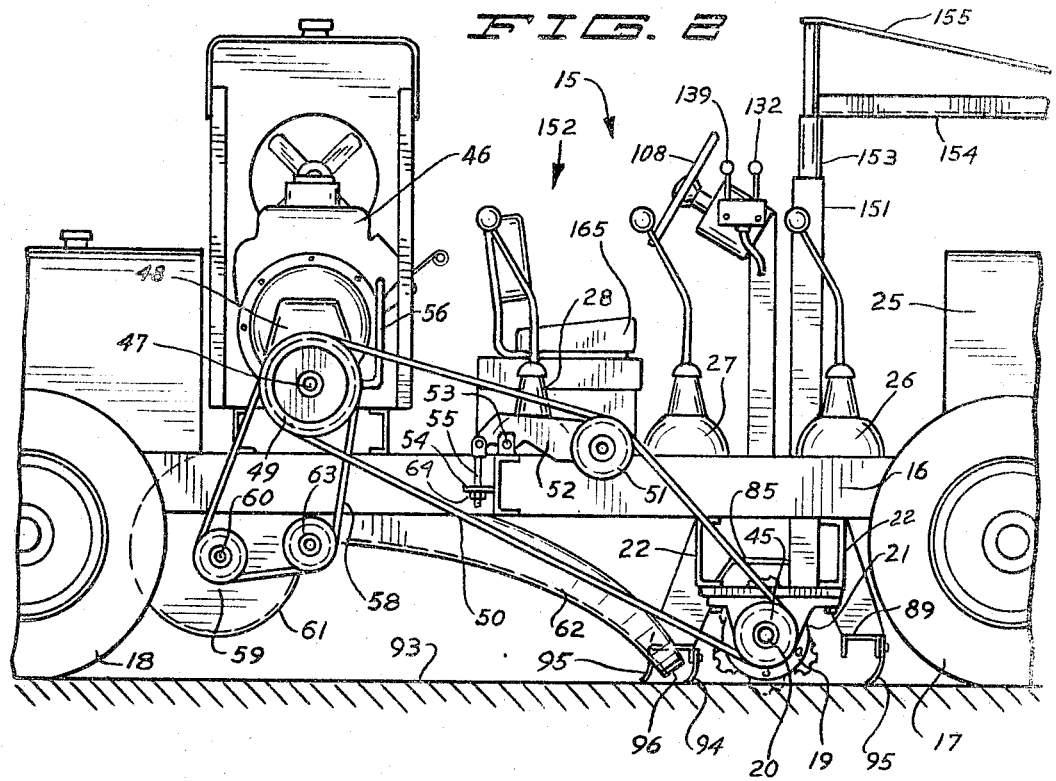
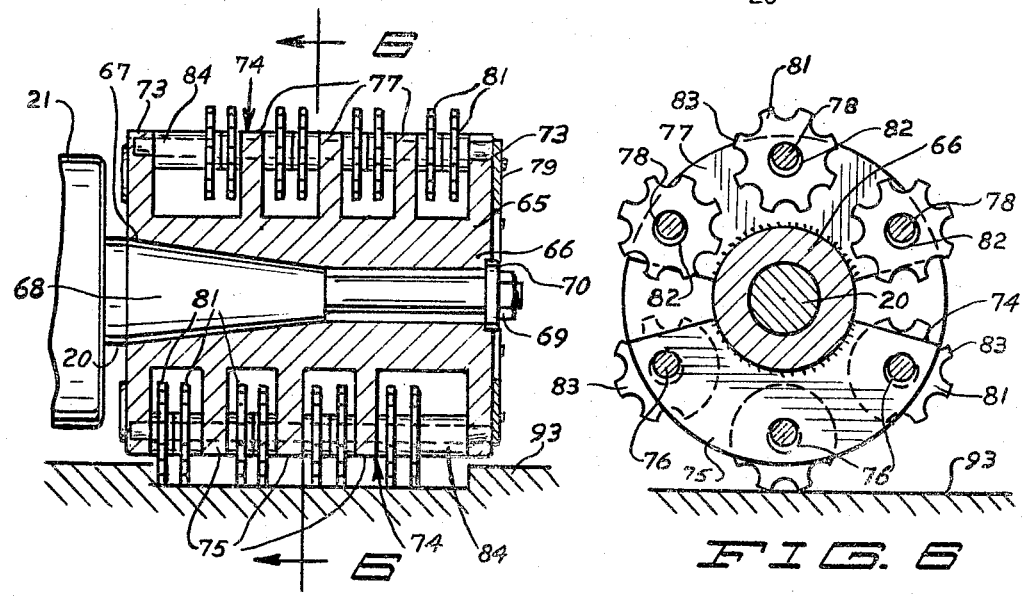

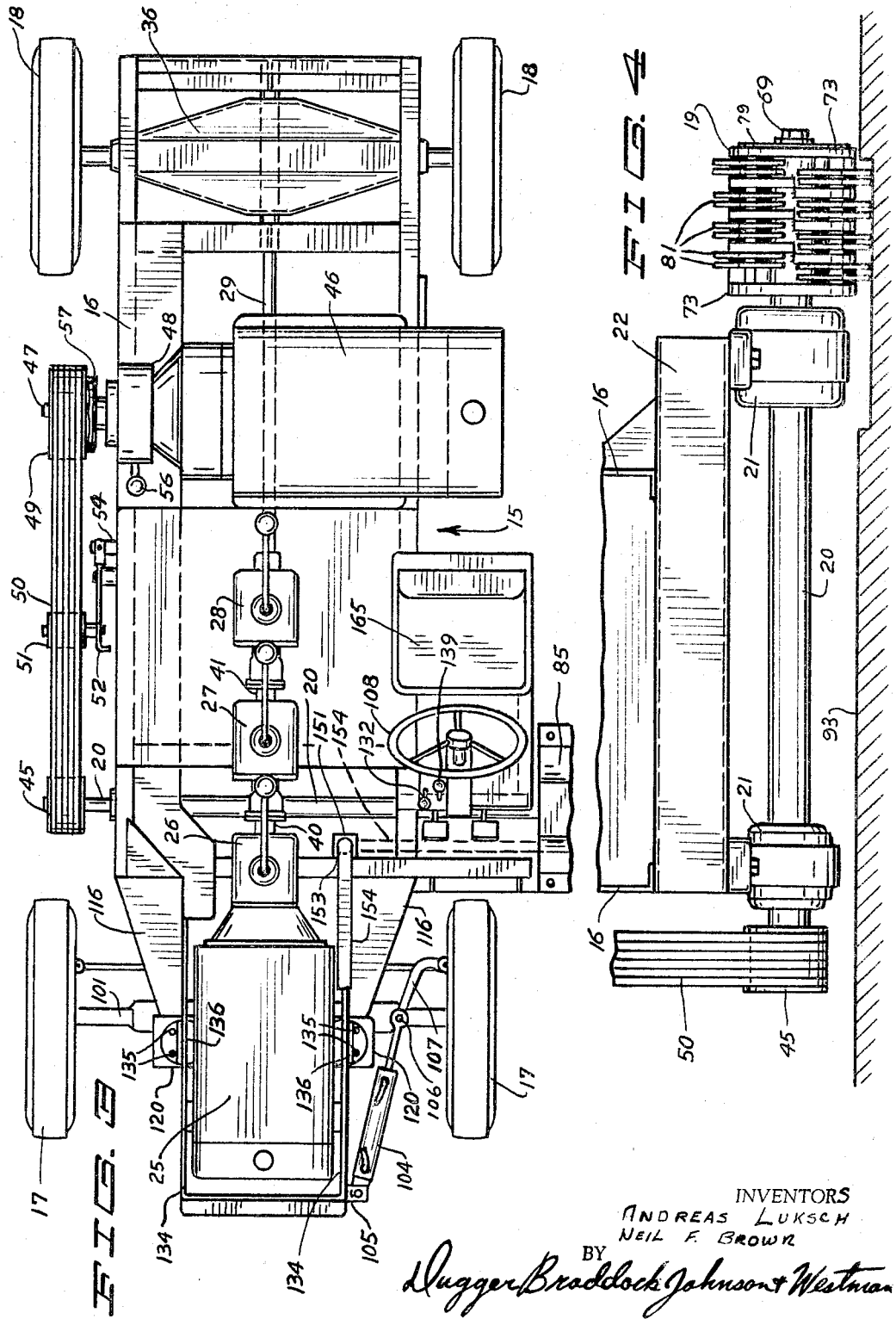

INVENTORS
ANDREAS LUKSCH
NEIL F. BROWN
BY Dugger, Braddock, Johnson & Westman
ATTORNEYS

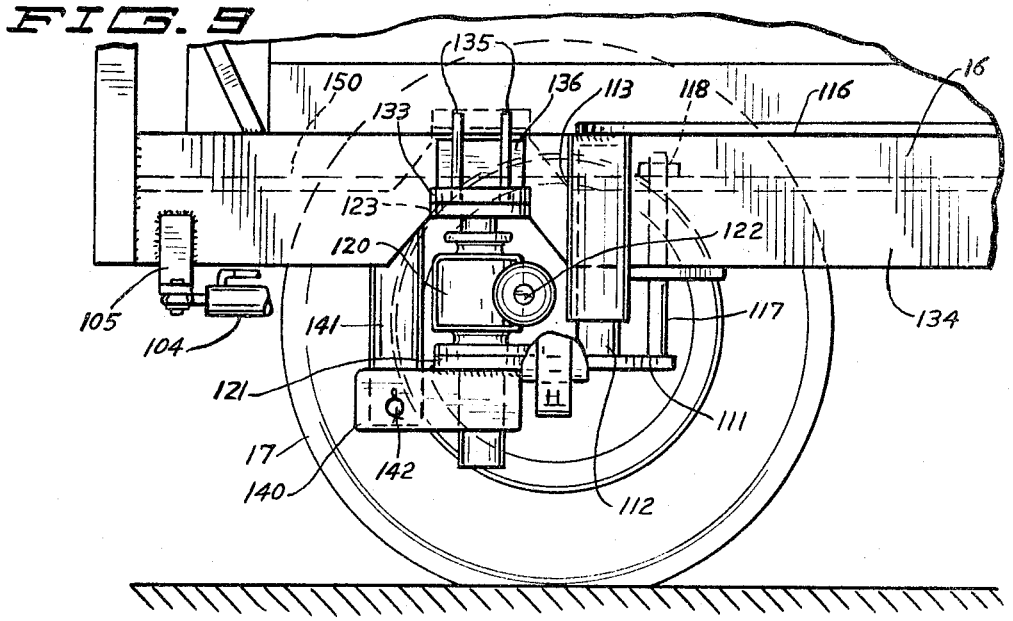
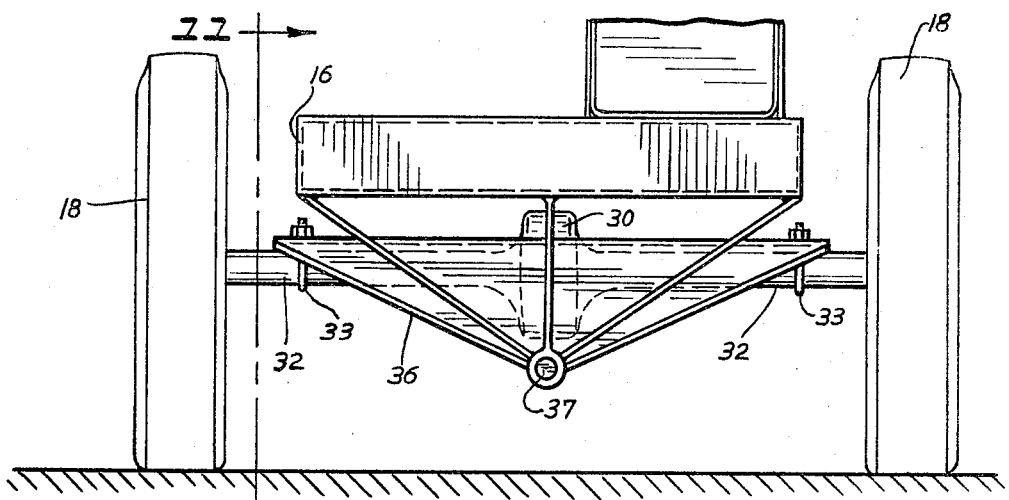
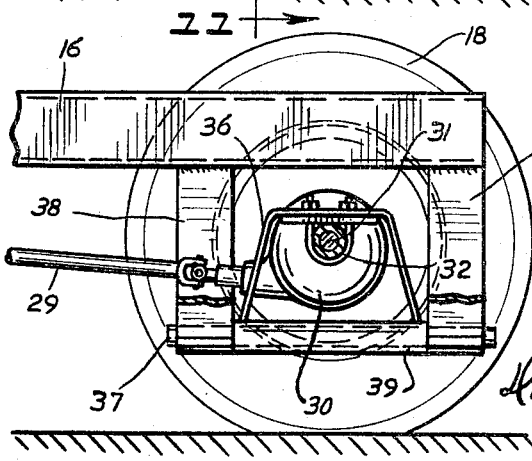

3,266,846
SURFACE CONDITIONING MACHINE
Andreas Luksch, Excelsior, and Neil F. Brown, Minneapolis, Minn., assignors to G. H. Tennant Company, Minneapolis, Minn., a corporation of Minnesota
Filed June 12, 1963, Ser. No. 287,229
9 Claims. (Cl. 299—39)

The present invention has relation to paved surface preparation equipment and more particularly to a self-propelled unit which will clean and scarify paved surfaces without injury to the substrate and will accomplish the scarification with precision depth and rapid coverage.

In the repair of surface defects to pavement in particular, it is important that any repair mixture be placed over a thoroughly cleaned and roughened surface in order to obtain maximum bond between the original concrete material and the patch material. This is extremely difficult as most of the concrete material, in particular, is very hard and a great deal of power is required to do any type of scarification.

As shown, the present invention presents a machine which will scarify a twelve-inch wide path through the use of a rotating head having a plurality of cutting elements thereon. The machine is self-propelled and is precisely adjusted to cut the proper depth in the concrete. The machine also has a quick lift attachment to raise the cutter head at the end of the run so that the machine can be easily turned.

A blower system is provided in order to blow away the dust and debris loosened by the cutter head so that the operator can see exactly where he is to go and also can make sure that the job is being performed satisfactorily.

Inasmuch as the wear on the cutters is considerable, means are provided on the machine for very quickly changing the cutter head assembly, which is extremely heavy.

The forward ground speed of the machine can be very low through the use of a plurality of series connected transmissions. The rear axle is mounted in such a manner so that the front wheels control the depth of the cutter to eliminate unevenness of cut and potential damage to the machine. The mounting of the axle also insures good traction at all times.

It is an object of the present invention to present a self-propelled road surface conditioning machine.

It is a further object of the present invention to present a self-propelled road surface conditioning machine which has accurate depth adjustment.

It is a still further object of the present invention to present a road surface conditioning machine in which the tool can be readily raised out of engagement with the surface being conditioned.

It is a still further object of the present invention to present a road surfacing machine having a wide surface conditioning tool mounted thereon and self-contained means for removing the tool for servicing.

Other and further objects are those inherent in the invention herein illustrated, described, and claimed, and will become apparent as the description proceeds.

To the accomplishment of the foregoing and related ends, this invention then comprises features hereinafter fully described and particularly pointed out in the claims, the following description setting forth in detail certain illustrative embodiments of the invention, these being indicative, however of but a few of the various ways in which the principles of the invention may be employed.

The invention is illustrated by reference to the drawings in which corresponding numerals refer to the same parts, and in which:

FIG. 1 is a side elevational view of a surface conditioning machine made according to the present invention;

FIG. 2 is a fragmentary side elevational view of the surface conditioning machine of FIG. 1 as viewed from the opposite side thereof;

FIG. 3 is a top plan view of the device of FIG. 1;

FIG. 4 is a fragmentary enlarged front elevational view of a surface conditioning tool used on the machine made according to the present invention;

FIG. 5 is a vertical sectional view of the surface conditioning tool illustrated in FIG. 4;

FIG. 6 is a sectional view taken as on line 6—6 in FIG. 5;

FIG. 9 is a fragmentary side elevational view of the frame and front axle assembly shown in FIG. 7;

FIG. 10 is a fragmentary enlarged rear elevational view of a road surface conditioning machine made according to the present invention showing the rear axle suspension; and FIG. 11 is a sectional view taken as on line 11—11 in FIG. 10.

Figure 7:
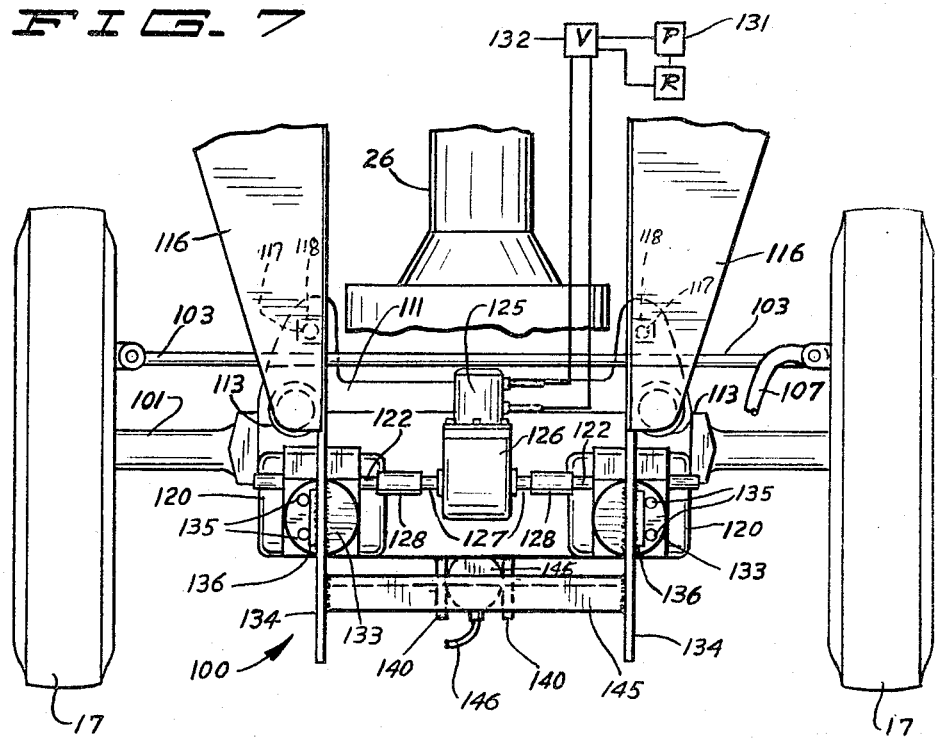
FIG. 7 is a fragmentary enlarged top plan view of the frame and front axle assembly of the surface conditioning machine made according to the present invention.

Referring to the drawings and the numerals of reference thereon, a road surface conditioning machine illustrated generally at 15 includes a main frame assembly 16 which is mounted on a pair of front wheels 17, 17 and a pair of rear wheels 18, 18. A surface conditioning tool or cutting tool assembly 19 is mounted on a shaft 20 which in turn is rotatably mounted in suitable bearings 21, 21 that are attached through brackets 22 directly to the frame 16. The tool 19 is positioned substantially immediately rearwardly of the front wheels of the machine.

Ground drive train

A propulsion power source or motor 25 is mounted onto the frame 16 adjacent the front end thereof. The motor 25 drives through first, second and third transmissions 26, 27 and 28, respectively, to a drive shaft 29 which in turn is connected through a differential 30 and axles 31, 31 mounted within axle housing 32, 32 to the rear drive wheels 18. The axle housings 32, 32 are mounted on an axle support member 36 with clamps 33, 33. The axle support member 36 is pivotally mounted on a substantially horizontal pin 37 which in turn is mounted to a pair of axle brackets 38, 38 that straddle the axle support 36. The axle brackets 38, 38 are fixedly attached to the rear portions of the main frame 16.

The pin 37 is mounted within a housing 39 which is fixedly attached to the axle support member 36. The rear axle is free to pivot about pin 37.

The three transmissions 26, 27 and 28 are connected in series with the output shaft 40 of the first transmission 26 connected to the input of the second transmission 27 and the output shaft 41 of the second transmission connected to the input of the third transmission 28. The output shaft of the third transmission is connected directly to the drive shaft 29.

Each of the transmissions is of a conventional design and by attaching the transmissions in a series a very slow ground speed can be obtained through the drive wheels 18, 18 with the engine 25 developing substantial power.

The engine 25 is thus used to propel the machine over the ground through the transmissions and drive train just described. A conventional clutch mechanism is used with the unit.

Tool power system

As can be seen the shaft 20 for the cutting tool assembly 19 extends transversely to the direction of travel of the machine and is positioned below the main frame 16. The brackets for the shaft and bearings are fixed in position with respect to the frame 16. The cutting tool assembly 19 extends beyond the outer edges of the wheels on one side of the machine and a drive sheave 45, which is drivably mounted onto the opposite end of shaft 20, extends beyond the other side of the frame 16. The cutting tool 19 is driven from an auxiliary motor or power supply 46 which is mounted on the frame 16 adjacent the rear portions of the machine and has an output shaft 47 that rotates about an axis transverse to the direction of travel of the machine. The output shaft 47 is connected to the motor shaft through a conventional clutch and gear reducer unit which is located within a housing 48. The clutch is controlled with a hand lever 56 that can be controlled by the operator to engage or disengage the clutch. The motor and gear reducer clutch assembly is a standard component available commercially.

A drive sheave 49 is drivably mounted onto the shaft 47 and a plurality of V-belts 50 extend from the drive sheave 49 to sheave 45. Thus, when motor 46 is running and the clutch on the motor engaged, the tool 19 will be rotated through the belt and sheave drive. A belt tightener sheave assembly 51 is mounted on a bracket 52 which in turn is pivotally mounted as at 53 to the main frame 16.

The bracket 52 can be controlled to force the sheave assembly 51 against the belts and tighten the belts 50 through the use of an adjustment bolt 55 which is mounted through a bracket 54 attached to frame 16. By tightening a nut 64 threaded on the bolt 55 the sheave assembly 51 is forced against the belts.

An auxiliary sheave 57 is mounted onto the output shaft 47 of the motor 46 and a belt 58 is mounted over the sheave. The belt 58 extends downwardly over a driven sheave 59 which is mounted onto a shaft 60 for a centrifugal fan or blower 61. The blower 61 is mounted to the frame 16. A belt tightener sheave 63 is utilized for tightening the belt 58 in a conventional manner.

The centrifugal blower 61 has a delivery conduit or nozzle 62 extending forwardly therefrom and curving toward the rear of the cutting tool assembly 19 as will be more fully explained later.

Cutting tool assembly

The cutting tool assembly 19, as perhaps best seen in FIGS. 5 and 6, is comprised as a main housing 65 which is made up of a central hub member 66 having tapered bore 67 adapted to fit over a tapered end portion 68 of the shaft 20. The housing 65 is drivably mounted onto the shaft forcing the bore 67 against the tapered end 68 of the shaft through the use of a bolt 69 which is threaded into the center of the shaft and applies a force against a washer 70 which in turn is positioned to ride against the housing 65 and force it against taper 68.

The hub 66 has a pair of integral end flanges 73, 73. A plurality of longitudinally spaced divider members 74 are made integral with the hub 66. As shown in FIGS. 5 and 6 the divider members are each comprised as a portion of a circular disk and are longitudinally spaced along the hub. The dividers extend at substantially right angles to the axis of the housing 65. The dividers are positioned so that they are arranged in two longitudinally aligned sets. Each of the sets of divider plates 74 are arranged so that they will mount three axially extending shafts that are radially spaced from the axis of the housing. For example, as shown in FIG. 6 the first set of dividers 75 mount shafts 76. The second set of dividers 77 mount shafts 78. The shafts 76 and 78 also are mounted in the flanges 73, 73. A retaining plate 79 is utilized to keep the shafts from moving longitudinally outward from the outer flange 73. The plate 79 is bolted to the outer flange. The shafts 76 and 78 are mounted within blind holes in the inner flanges 73 and are kept from moving longitudinally inwardly in this manner.

As shown in FIG. 5 the shafts 76 and 78 are used for mounting cutting tools 81 thereon. The cutting tools are comprised as disc-like members having bores 82 which are of larger diameter than the shafts on which they are mounted and having serrated or toothed outer peripheral edges 83. There are two cutting tools mounted on each shaft between each of the adjacent pairs of dividers. It will be seen that the cutters are positioned so that as the tool rotates a strip the entire width of the cutting tool 19 is conditioned. The tools mounted on shaft 76 are axially offset from the tools mounted on shafts 78. Thus as the housing 65 rotates the cutting tools on the shaft 76 will cut a path adjacent the path cut by the tools on shafts 78.

Where necessary, spacers 84 are placed between the tools and the adjacent divider or disc. If desired, spacers can also be placed between the cutting tools themselves. The shafts 76 and 78 are held in their support members from rotating. However, the cutting tools 81 are free to rotate and to wobble back and forth on their shafts due to the large bores 82.

Thus the relative position of the cutting tools 81 is determined in a large part by centrifugal force of the unit and the surface against which they work. As the tools 81 strike the surface over which they are drawn they will abrade away portions of it. The tool is run at a speed which is sufficient to force the tools 81 outwardly but not great enough so that centrifugal force prevents them from rotating on their shafts.

As can be seen in FIG. 1 a heavy cover 85 is pivotally mounted as at 86 to brackets 87. The brackets 87 in turn are attached to a channel member 88 that is mounted to the brackets 22 for mounting the shaft 20. The cover member 85 rests with the front portion thereof on a front channel member 89 which is also attached to one of the brackets 22 for mounting the shaft. The cover may be latched in its closed position. The cover 85 prevents debris from being thrown upwardly when the unit is being operated.

The front channel 89 has a piece of tire carcass or a similar flexible sealing strip 92 attached thereto and extending downwardly into engagement with the ground surface 93. The rear channel member 88 has first and second rear flexible sealing strips 94 and 95, respectively, attached thereto. The sealing strips form an open ended duct 96. The duct 96 receives air from the end of the curved tube 62 which leads from blower 61, and directs the air across the path just previously cut by the tool assembly 19. This blows the dirt, dust and debris away from the path so that the operator can see exactly where he is going and can make the next path in the precise position that is necessary.

Front axle assembly and depth control

Figure 8:
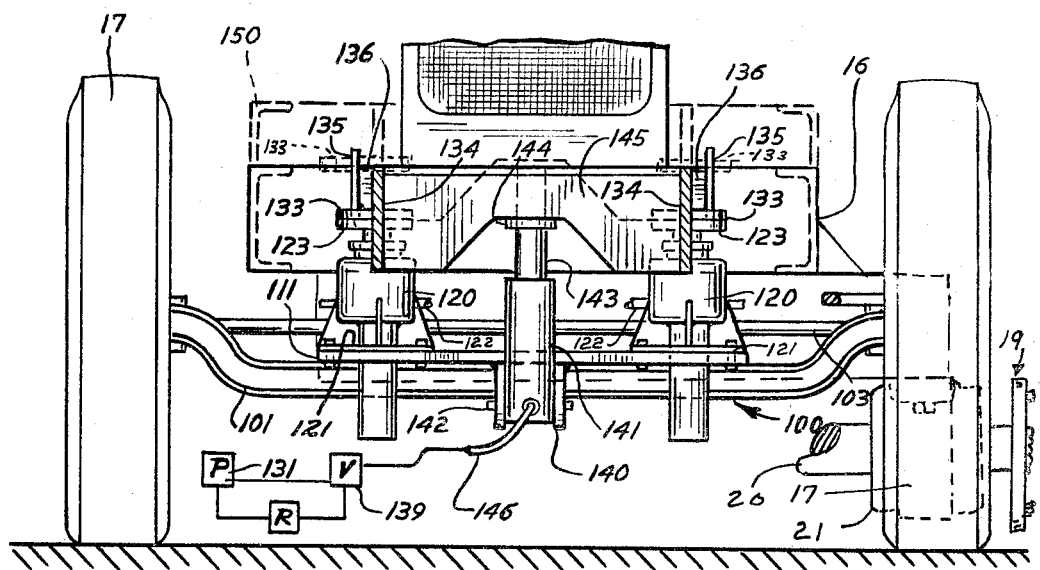
FIG. 8 is a front elevational view of the device of FIG. 7 with parts broken away for the sake of clarity.

The main frame 16 is mounted at the front end thereof on an independent front axle assembly perhaps best illustrated in FIGS. 7, 8 and 9. The independent front axle assembly illustrated generally at 100 is movable in a vertical direction with respect to the frame. The axle assembly includes a front axle 101 which extends transversely to the machine. The front wheels 17, 17 are rotatably mounted on opposite ends of the front axle member. The front wheels are mounted about vertical king pins (not shown) in a conventional manner and a steering linkage 103 permits steering of the vehicle. Steering is accompilshed through the use of a hydraulic cylinder 104 which is attached to the frame 16 through a bracket 105 and is further attached as at 106 to a steering arm 107. The steering is accomplished with a conventional hydraulic steering motor operating to direct fluid under pressure to cylinder 104 and controlled by the steering wheel 108.

A heavy support plate 111 is fixedly attached to an upper surface of the axle 101 and is used for mounting adjustment linkage for adjusting the frame 16 with respect to the front axle assembly 100.

The axle assembly 100 is retained and guided for vertical movement with respect to the main frame 16 through a pair of heavy upright guide members 112, 112 which are fixedly attached to the plate 111 in position on opposite sides of the frame 16, the guide members are slidably mounted within tubes 113, 113 which are fixed to the frame 16 and are attached to frame reinforcing plates 116. In addition, a pair of upright shafts 117, 117 are fixed to the plate 111 and extend upwardly through ears 118 which are attached to the frame 16.

The guide member 112 and tubes 113 are very closely fitted and hold the axle securely onto the frame to prevent it from cocking and twisting. There is no fixed connection between the frame and the axle assembly.

By vertically raising and lowering the frame 16 with respect to the front axle the depth of the cutting tool assembly 19 can be controlled. The depth of the cutting tool assembly is accurately controlled through the operation of a pair of screw jacks 120, 120 which are fixed as at 121, 121 to the plate 111. The screw jacks are of conventional design and may be purchased commercially. The jacks each have an input shaft 122, 122 which, when turned, will operate a vertically movable screw which will raise or lower actuator plates 123, 123 attached to the movable screws.

A hydraulic motor 125 is mounted on plate 111 and drives an input shaft of a right angle gear box 126. The gear box 126 has a double ended output shaft 127. Each of the ends of the shaft 127 is connected through a suitable coupling 128, 128 to the input shaft 122 of one of the screw jacks 120.

The hydraulic motor 125 is powered by fluid under pressure coming from a pump 131, illustrated schematically in FIG. 7. A valve 132 is connected through suitable conduits to the pump and controls the flow of fluid under pressure through the conduits to the motor 125. The valve is a double acting valve and fluid under pressure can be directed to the motor 125 so as to cause the motor to rotate in either direction of rotation. The valve 132 is mounted adjacent the steering wheel 108 within reach of the operator.

Thus, by operating the hydraulic motor, the gears within gear box 126 will be driven, shaft 127 will turn and this will turn input shafts 122 of the screw jacks. The jacks will then be caused to raise or lower the actuator plates 123, depending on the direction of rotation of motor 125. By raising and lowering the actuator plates the position of main frame 16 with respect to the front axle assembly will be changed. The frame 16 will pivot about the rear wheels and thus the cutting tool assembly 19 will be raised or lowered with respect to the ground surface. The vertical movement of the screw jacks 120, 120 is relatively slow and the depth of cut can be accurately controlled.

The actuator plates 123, 123 engage frame pads 133, 133 which are fixedly attached directly onto forward side stringer members 134, 134 of the main frame 16. The frame pads 133, 133 have openings provided therethrough and each of the actuator pads 123, 123 has a pair of guide rods 135, 135 fixedly mounted thereon. The guide rods 135, 135 extend through provided openings in pads 133, 133 and serve to keep the frame centered on the actuator pad 123. The guide rods 135 slide against wear blocks 136, 136 which are fixedly attached to the frame side members 134, 134.

In order to quickly lift the cutting tool assembly 19 out of engagement with the ground so that the machine can be turned, a quick lift hydraulic cylinder is provided which will lift the frame independently of the screw jacks. A pair of brackets 140, 140 are fixedly attached to plate 111 and extend forwardly therefrom. A single acting hydraulic cylinder 141 is positioned between the brackets and is held with respect thereto with a pin 142. The cylinder has a rod 143 which is extendable and retractable under fluid pressure. A pad 144 is positioned at the top of the rod. The pad 144 engages the bottom edge surface of a cross member 145 extending between the side members 134, 134 of frame 16.

When the frame 16 is to be raised, to in turn raise the cutting tool assembly 19, fluid under pressure is supplied to the interior of the cylinder 141 through a conduit 146. The fluid under pressure can be supplied from the same pump 131 that is used for operating hydraulic motor 125. A separate valve 139 can be used for controlling the quick lift cylinder. The valve is also positioned adjacent the steering wheel 108. The pump 131 can be driven from the main drive engine 25 in a conventional manner.

When the frame 16 is to be lowered so that the cutting tool again engages the surface 93, the control valve 139 which is utilized for controlling the cylinder 141, can be moved to position to release the fluid trapped within the cylinder 141 back to the reservoir and the rod 143 will retract within the cylinder. The frame pads 133 will be stopped against the pads 123 of the screw jacks.

The front end of frame 16 can be raised to position as shown in dotted lines at 150 in FIGS. 1 and 8. This distance is sufficient for the tool 19 to clear the ground surface and permit the operator to make a turn without dragging the tool during the turn. The lift is rapid and when released the frame will return to its original position, with the tool at proper depth.

*Tool assembly change fixture*

The cutting tools 81 wear considerably and must be changed periodically. In order to facilitate this a mounted hoist is utilized on the machine. The complete housing 65 is changed in the field and the tools 81 replaced in the shop. In this way the machine is stopped only a minimum amount of time. An upright tube 151 is mounted to the top of frame 16 adjacent the operator's position 152. A second tube 153 is telescoped within tube 151 and an upper track member 154 is fixed to tube 153 and extends at right angles thereto. The track 154 is braced with a suitable brace 155. A carriage 156 is mounted on rollers 157, 157 which ride on the track and is movable in direction therealong as indicated by double arrow 160.

A chain hoist 161 is mounted on the carriage 156. The hoist is controlled through a hand operated lever 162 that raises and lowers a chain 163. The chain 163 has a hook 164 mounted thereon. The hook is adapted to be attached to the cutting tool assembly 19 and will raise the weight of the cutting tool as it is removed from shaft 20 (after bolt 69 has been removed). The inner tube 153 can be pivoted to position so that it is substantially directly over the cutting tool and the tool can be moved in a longitudinal direction with respect to shaft 20 by rolling carriage 156 along the track 154.

When the hoist is not being used it can be held in position by placing hook 164 under the frame side members 134 as shown in FIG. 1. Through the use of the hoist which is self-mounted on the surface conditioning unit the changing of cutting heads is greatly simplified.

Operation

The operator sitting on seat 165 can control all of the functions of the machine as well as the ground speed. The unit utilizes conventional braking mechanisms and clutch mechanisms for the ground drive.

The hydraulic steering is through a pump driven by a steering wheel 108 and is utilized to move cylinder 104 in suitable direction to steer the front wheels 17. The steering unit is available commercially at the present time.

When the machine is to be operated the depth of cut is set by adjusting screw jacks 120, 120 through the use of hydraulic motor 125. The auxiliary power unit 46 can be started and the clutch engaged to power shaft 20 to rotate the cutting tool. The fan 61 will also be operating at the time the tool starts to rotate.

The unit can then be lowered into engagement with the ground surface by operating valve 139 to lower the hydraulic cylinder 141 and rest the frame on the screw jacks. Pads 133 meet with pads 123 and the frame is supported at the proper preset depth. The forward speed of the unit is then set through the settings of the gear ratios in the transmissions 26, 27 and 28 which in turn will drive the rear wheels through the drive shaft and differential. As the unit moves forwardly the top portions of the material on the surface 93 are removed and the blower 61 directs a blast of air through duct 96 formed by the flexible strips 94 and 95. The air will remove the dust and debris from the cut and the operator will then be able to see where the next cut should be.

At the end of the strip that is to be cut the operator will actuate hydraulic cylinder 141 to raise the frame 16 and remove the tool 19 from cutting engagement with the supporting surface. The operator will then make his turn in a conventional manner, lower the frame 16 and a new cut will be started. The heavy cover 85 over the tool prevents pieces of rock and other debric from flying upwardly and hitting the operator during operation.

It can be seen that with the shaft 20 located closely behind the front wheels the depth of cut is relatively accurately controlled. The depth adjustment is through the front axle of the machine and any irregularities in the surface will not affect the machine greatly. In addition, the position of the rear wheels will have very little effect on the depth of cut. While the cutting tool is cantilevered out to the side of the machine, the rear wheels are independently mounted about a horizontal pivot so that they can pivot without adversely tilting the machine during operation. If one of the front wheels drops into a pocket the effect on the cutting head is not great.

By using the screw jacks for precisely setting the tool depth and having an independent quick lift for the frame, the operation of conditioning surfaces is greatly speeded up and operator fatigue is reduced to a minimum.

The machine can be operated at relatively high speed. This will cause it to float over high spots and small depressions. These irregularities will not adversely affect operation.

The tool cleans and roughens the surface and removes deteriorated concrete to the desired depth for preparation of the surface. The surface can then be repaired by replacing a new layer of concrete or some other surfacing material on the treated surface. The new layer of concrete will bond to the substrate that has been conditioned.

What is claimed is:

1. A surface conditioning machine comprising a vehicle, said vehicle including a frame, means on said frame for supporting it for movement longitudinally along a supporting surface to be conditioned, said supporting means including a rear axle assembly mounted to the frame and a front axle assembly directly supporting the frame, a shaft rotatably mounted on the bottom side of said frame on an axis transverse to the direction of travel of said frame, said shaft having an end portion extending transversely outwardly beyond said frame, a cutting tool assembly mounted on the outwardly extending end of said shaft, said shaft being mounted closely adjacent the front axle assembly of said frame, means for adjusting the height of said tool with respect to said supporting surface, power means for propelling said vehicle along said surface, means for driving said tool assembly about its axis, a power driven blower on said frame and having a discharge nozzle for directing a blast of air from said blower to the path previously cut by said tool assembly.

2. The combination as specified in claim 1 wherein said front axle assembly is slidably mounted below said frame for movement in vertical direction and wherein said means for adjusting the height of said tool with respect to the supporting surface is comprised as screw jack means mounted on said front axle assembly, said screw jack means having movable elements positioned to bear upon and support said frame from downward movement only.

3. The combination as specified in claim 2 wherein said screw jack means includes two screw jacks, and the movable elements of said screw jacks are controlled by input shafts, each of said shafts being drivably connected to a gear box, and a hydraulic motor driving said gear box for rotating said shafts and thereby moving said actuator plates.

4. The combination as specified in claim 3 and an independent quick lift system for moving said frame with respect to said front axle assembly in a vertical direction, said quick lift system comprising a hydraulic cylinder mounted on said front axle assembly and a rod extendable and retractable when said cylinder is subjected to fluid under pressure, said rod having means thereon for engaging a portion of said frame to lift said frame independently of said screw jacks when fluid under pressure is supplied to said cylinder a sufficient distance so the cutting tool clears the surface on which the machine is working.

5. The combination as specified in claim 1 and means to pivotally mount the rear axle assembly to the frame about a substantially horizontal longitudinally extending pivot axis which is below the rear axle assembly.

6. A surface conditioning machine comprising a vehicle, said vehicle including a frame, means on said frame for supporting it for movement longitudinally along a supporting surface to be conditioned, said means including a rear axle assembly and a front axle assembly, a cutting tool mounted on said frame for rotation about an axis substantially transverse to the direction of movement of said frame, said cutting tool being mounted closely adjacent the front axle assembly of said frame and adjacent one side thereof and extending beyond said frame, means for adjusting the height of said tool with respect to said supporting surface, power means for propelling said vehicle along said surface, means for driving said cutting tool about its axis, a blower on said frame having a discharge nozzle, a member fixedly attached to said frame and positioned immediately behind said cutting tool, a pair of spaced, flexible strips attached to said member, said flexible strips contacting said surface to be conditioned and forming an open ended duct, the discharge nozzle of said blower being directed into one end of said open ended duct to blow debris within said duct away from said frame.

7. The combination as specified in claim 6 wherein said rear axle assembly is pivotally mounted with respect to said frame about a substantially horizontal longitudinally extending axis.

8. The combination as specified in claim 6 wherein said power means for propelling said vehicle along said surface includes an engine mounted on said frame, a plurality of transmissions connected in series and driven by said engine, and drive shaft connected to the last transmission in series and drivably connected to the rear axle assembly.

9. The combination as specified in claim 8 wherein said means for driving said tool assembly includes a separate engine mounted adjacent the rear portions of the frame.

References Cited by the Examiner
UNITED STATES PATENTS

| | | | |
|---|---|---|---|
| 1,084,810 | 1/1914 | Messer | 299—39 |
| 1,593,948 | 7/1926 | Monroe | 299—39 |
| 2,022,757 | 12/1935 | Buffington | 37—153 |
| 2,606,011 | 8/1952 | Lommen | 299—39 |
| 2,658,290 | 11/1953 | Pierce | 172—33 X |
| 3,037,755 | 6/1962 | Hatcher | 299—39 |
| 3,156,231 | 1/1964 | Harding | 299—39 |

ERNEST R. PURSER, *Primary Examiner.*

JACOB L. NACKENOFF, *Examiner.*